(12) United States Patent
Jarman et al.

(10) Patent No.: US 7,650,898 B2
(45) Date of Patent: Jan. 26, 2010

(54) ADJUSTABLE POLE

(76) Inventors: Robert W. Jarman, 1891 Yosemite Rd., Berkeley, CA (US) 94707; Fred J. Pretti, 750 Crestview Dr., Pinole, CA (US) 94564

( * ) Notice: Subject to any disclaimer, the term of this patent is extended or adjusted under 35 U.S.C. 154(b) by 93 days.

(21) Appl. No.: 12/107,558

(22) Filed: Apr. 22, 2008

(65) Prior Publication Data

US 2009/0114258 A1    May 7, 2009

Related U.S. Application Data

(60) Provisional application No. 60/941,475, filed on Jun. 1, 2007.

(51) Int. Cl.
*A45B 9/00* (2006.01)
(52) U.S. Cl. .......................................... 135/75; 135/69
(58) Field of Classification Search .................. 135/65, 135/69, 75; 74/551.3–551.7, 562, 546; 411/348; 280/823, 820; 403/112, 377
See application file for complete search history.

(56) References Cited

U.S. PATENT DOCUMENTS

| 2,838,266 | A | * | 6/1958 | Rees | 248/354.1 |
| 3,722,903 | A | * | 3/1973 | Jones | 280/823 |
| 4,596,405 | A | * | 6/1986 | Jones | 280/823 |
| 5,593,239 | A | * | 1/1997 | Sallee | 403/109.3 |
| 6,250,839 | B1 | | 6/2001 | Lenhart | |
| 6,354,629 | B1 | * | 3/2002 | McNeal et al. | 280/823 |
| 6,782,903 | B1 | * | 8/2004 | Jarman et al. | 135/75 |
| 7,000,497 | B1 | * | 2/2006 | Campbell et al. | 74/525 |

FOREIGN PATENT DOCUMENTS

| JP | 3050968 | 8/1998 |
| KR | 20-1996-0002727 | 3/1996 |
| KR | 20-0398330 | 10/2005 |

* cited by examiner

*Primary Examiner*—David Dunn
*Assistant Examiner*—Danielle Jackson
(74) *Attorney, Agent, or Firm*—West and Associates, A PC; Stuart J. West; Charlotte Rodeen-Dickert

(57) ABSTRACT

A pole mechanism that can be adjusted with one hand that can be used in trekking poles, tool handles, and other applications requiring the use of an adjustable-length elongated member.

8 Claims, 5 Drawing Sheets

ADJUSTABLE POLE

STATEMENT OF PRIORITY

The following application claims priority to U.S. Provisional Patent Application No. 60/941,475, filed Jun. 1, 2007, the complete contents of which are hereby incorporated by reference.

BACKGROUND

1. Field of the Invention

The present disclosure relates to the field of adjustable-length poles, particularly those used in outdoor equipment, such as support poles for trekking.

2. Background

Many hikers, backpackers, and mountaineers use a single pole or a pair of poles for additional support while trekking. On uneven, steep, or slippery terrain, these poles can provide stability. In addition, these poles can assist in distributing a person's weight, thereby reducing the stress on the knees, hips, and ankles, as well as providing extra power by engaging the strength of the upper body.

As trekkers come in many shapes in sizes, so must their poles. To obtain the maximum benefit from the poles, it is important that the poles are sized properly to not only the person, but also adjustable to the terrain. For example, when trekking uphill a person may want the poles slightly shorter than normal, but if going downhill, he may want them slightly longer. In addition, a person may also want to conveniently store the poles when not in use, whether on the trail or in a closet or bag.

Several types of adjustable trekking poles presently exist to fill this need. Typically, these are multi-sectional poles that telescope out to the desired length and then lock into place with either a twisting mechanism or a spring-loaded pin. Although adjusting these poles is not terribly difficult, a person must stop on the trail and usually use two hands to make any necessary adjustments. This can be, at best, slightly inconvenient, or even possibly dangerous on hazardous terrain. When trekking in an environment with multiple ascents and descents, frequent pole adjustments can break the person's rhythm and create a nuisance. In cold weather, this operation could be further complicated by bulky gloves, which could prevent proper adjustment and securing of the pole lengths.

A mechanism providing easy, one-handed adjustment of a pole could also be useful in many other applications other than trekking poles. For example, a painter may need to quickly telescope out a painting device to reach a high ceiling, and then need a shorter handle for painting down low. Similarly, maintenance personnel could also benefit from having cleaning tools with variable-length handles that can be adjusted with one hand.

What is needed is a one-handed mechanism for easily and quickly adjusting the length of a trekking pole or other tool with for minimal disruption to a trekker's travel on the trail or a worker on the job.

DETAILED DESCRIPTION

Figure 1:
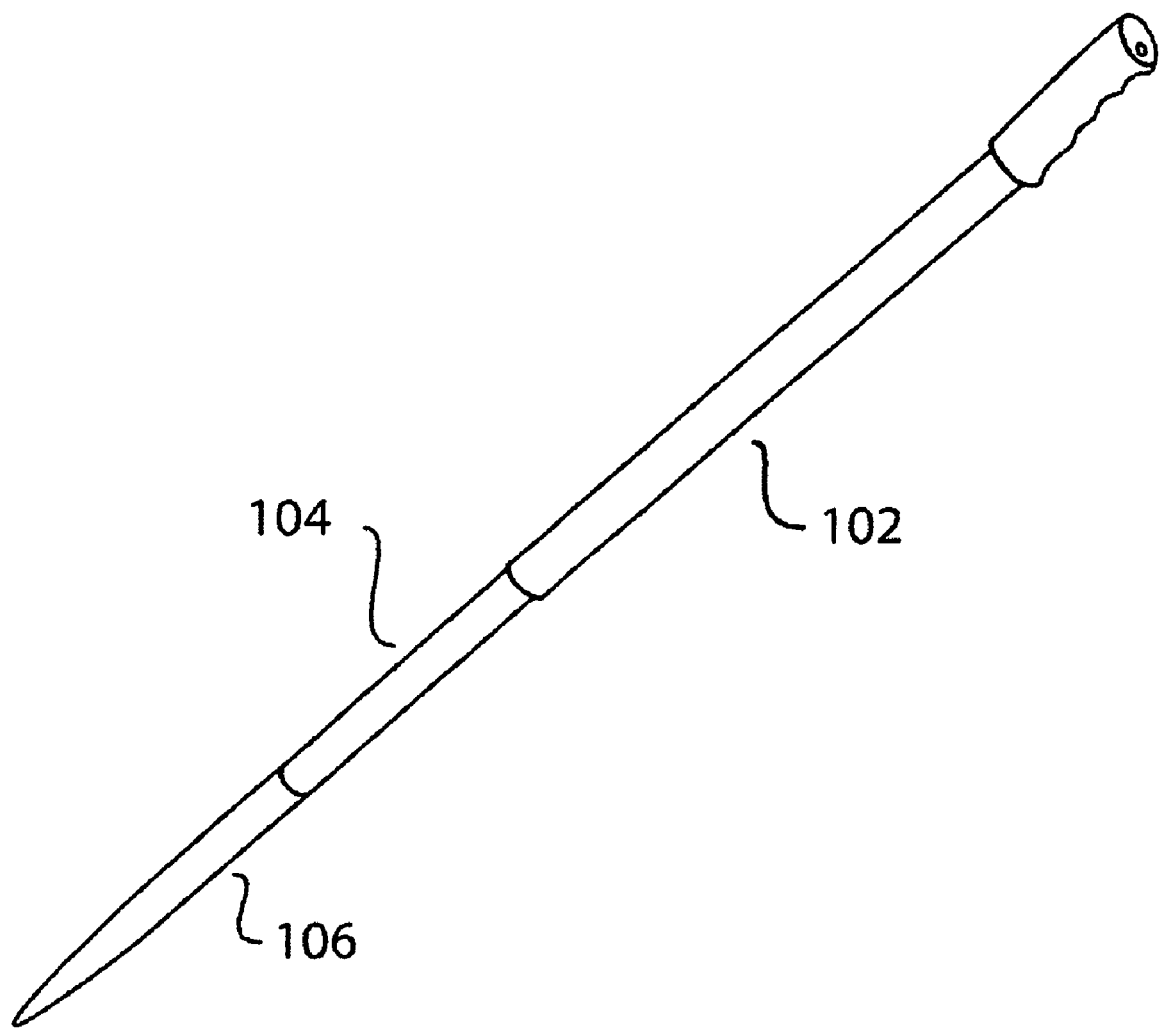
FIG. 1 is a perspective view of an embodiment of the present device.

FIG. 1 shows a perspective view of an embodiment of the present device. In some embodiments, a first elongated tubular member 102 and a second elongated tubular member 104 can be slidably coupled such that the proximal end of a second elongated tubular member 104 can telescope out from and retract into the distal end of a first elongated tubular member 102. In other embodiments, the distal end of a first elongated tubular member 102 can telescope out from and retract into the proximal end of a second elongated tubular member 104. A second elongated tubular member 104 can also taper from the proximal end to the distal end. In some embodiments, an end member 106 can be attached to the distal end of a second elongated tubular member 104 and taper from the proximal end to the distal end. In other embodiments, an end member 206 can be integrated with the distal end of a second elongated tubular member 104. Although depicted in FIG. 1 having a circular cross-section, a first elongated tubular member 102, a second elongated tubular member 104, and an end member 106 can have any known and/or convenient cross-sectional geometry and dimensions.

Figure 2:
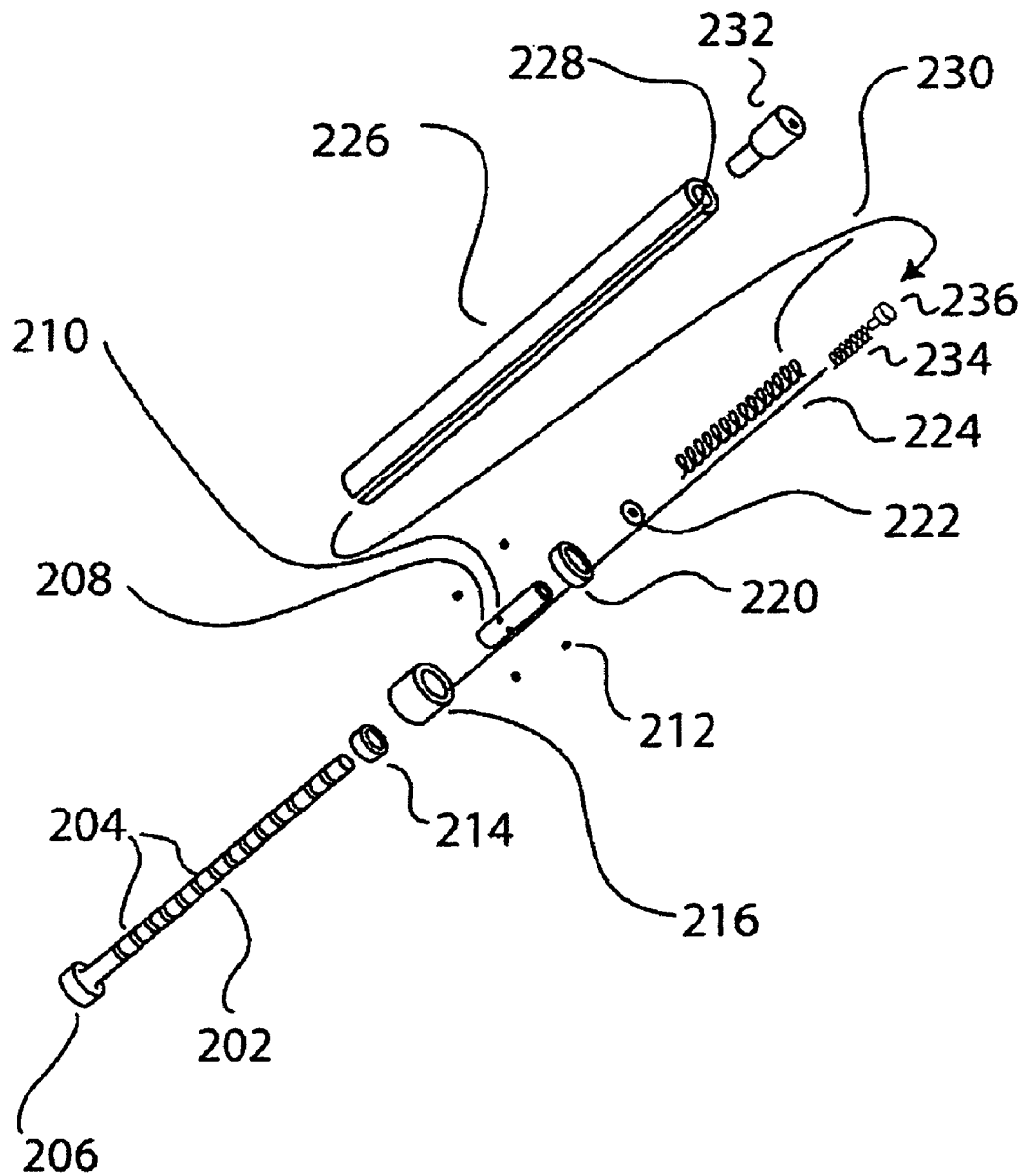
FIG. 2 is a perspective view of an embodiment of the adjusting mechanism of the present device.

A first elongated tubular member 102 and a second elongated tubular member 104 can house a mechanism to adjust the overall length of the present device. FIG. 2 depicts a perspective view of an embodiment of a mechanism. A rod 202 can have a plurality of indentations 204 that can be substantially evenly spaced along the length of a rod 202. In some embodiments, said indentations 204 can be substantially rounded, but in other embodiments said indentations 204 can be any known and/or convenient geometry and dimensions. Said indentations can also be circumferential grooves, which can have a substantially rounded cross section or any known and/or convenient geometry and dimensions. An end member 206 can be connected to the distal end of a rod 202 and can selectively engage with the interior of a second elongated tubular member 104 to hold an end member 206 and a rod 202 in place within a second elongated tubular member 104. Although depicted here in FIG. 2 as having circular cross-sections, a rod 202 and an end member 206 can have any known and/or convenient cross-sectional geometry and dimensions.

Figure 2A:
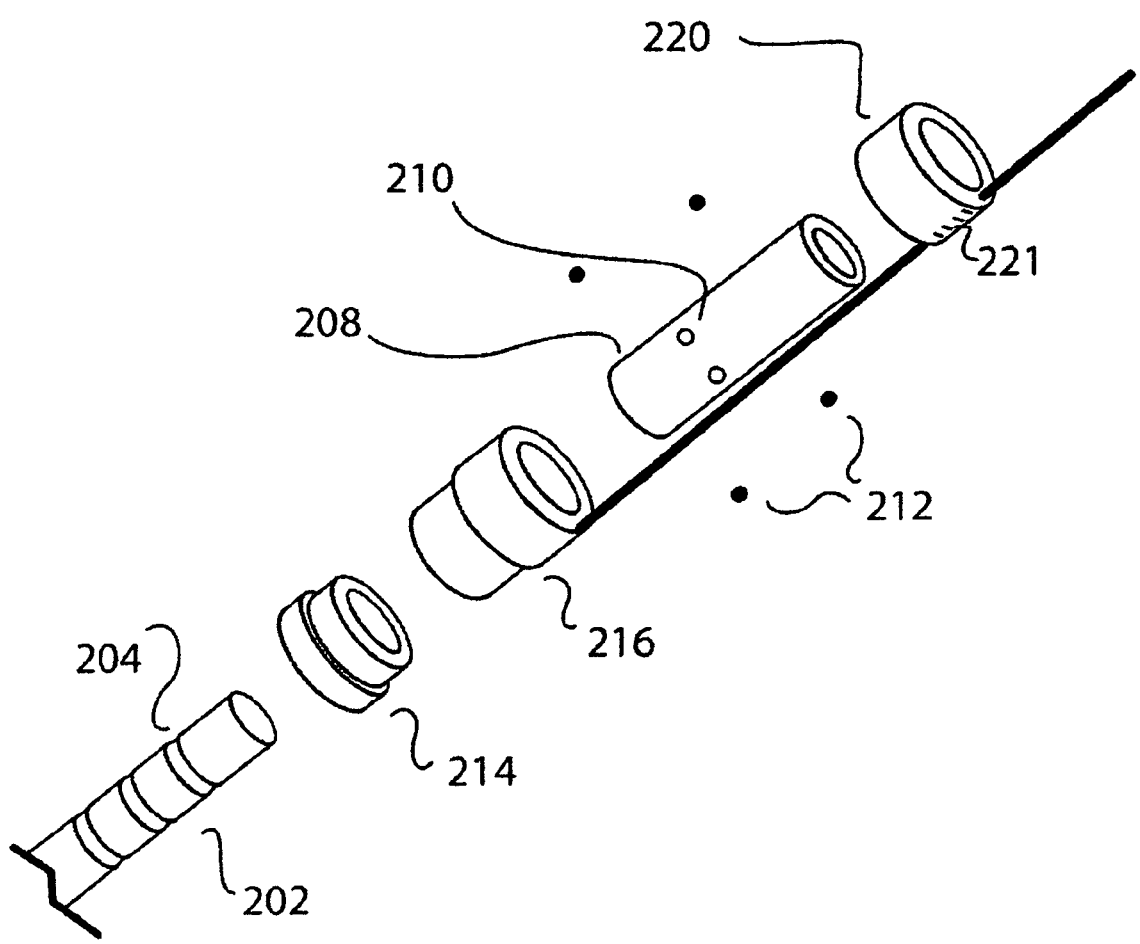
FIG. 2a is a detail perspective view of an embodiment of the actuating mechanism of the present device.

FIG. 2a depicts a detail perspective view of an embodiment of the actuating mechanism of the present device. A locking tube 208 can have at least one opening 210 through the wall of a locking tube 208. Although depicted in FIG. 2a as being substantially circular, an opening 210 can have any known and/or convenient geometry and dimensions. In some dimensions, a locking tube 208 can have an interior cross-sectional configuration and dimensions such that a rod 202 can slide through it. At least one spherical member 212 can be set into at least one opening 210.

A stop collar 214 can have an interior cross-sectional configuration and dimensions such that it can be selectively coupled with the distal end of a locking tube 208. A stop collar 214 can have an exterior cross-sectional configuration and dimensions such that the exterior cross-sectional area is less than that of an end member 206.

Figure 2B:
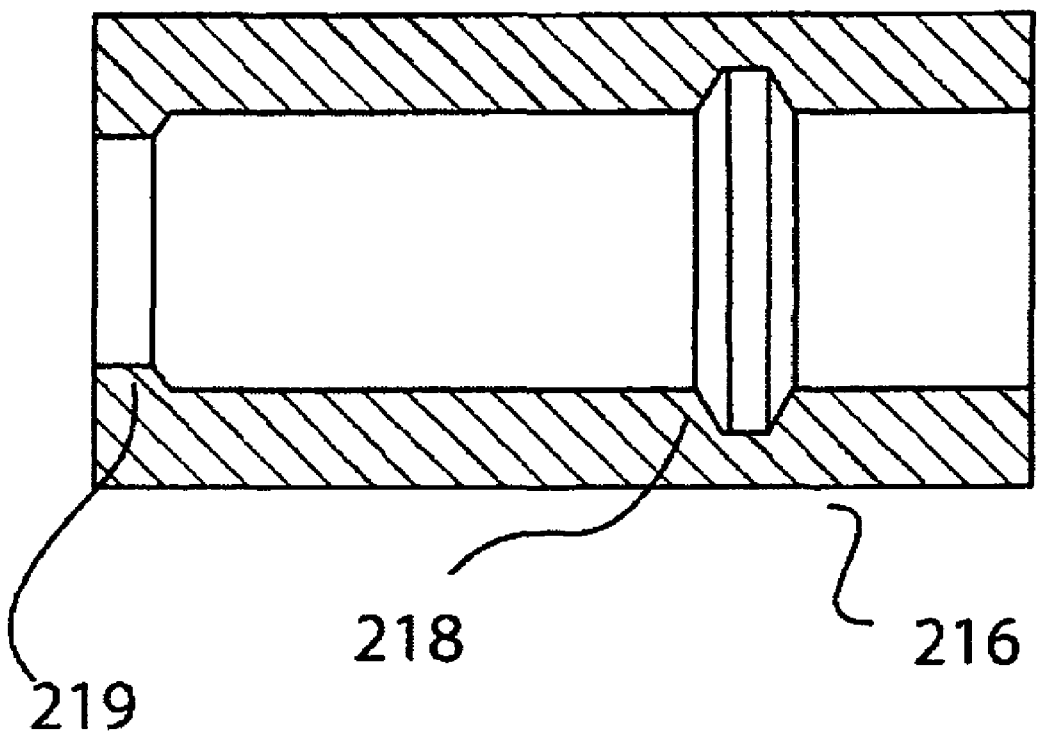
FIG. 2b is a detail of the longitudinal cross section of an embodiment of an actuating collar component of the present device.

FIG. 2b shows a detail of an embodiment of an actuating collar 216. An indentation 218 can be located on the interior surface of an actuating collar 216. An indentation 218 can located substantially proximal to the transverse midline or at any known and/or convenient location on the interior surface of an actuating collar 216 or at any known and/or convenient location on the interior surface. Further, in some embodiments, an indentation 218 can be substantially rounded, but in other embodiments can be any known and/or convenient geometry and dimensions. In some embodiments, said indentation can also be a circumferential groove, which can have a substantially rounded cross section or any known and/or convenient geometry and dimensions.

In some embodiments, as shown in FIG. 2 and FIG. 2*a*, a second stop collar 220 can have an interior cross-sectional configuration and dimensions such that it can be selectively coupled with the proximal end of a locking tube 208. A second stop collar 220 can have an exterior cross-sectional configuration and dimensions such that the exterior cross-sectional area is less than that of an end member 206. Further, a second stop collar 220 can have an opening running longitudinally through a second stop collar 220 at a point substantially at the midpoint between the interior and exterior surfaces of a second stop collar 220. In some embodiments, this opening can be substantially rounded, but in other embodiments can be any known and/or convenient geometry and dimensions.

A washer 222 can be removably coupled with the proximal end of a rod 202. Although depicted in FIG. 2*a* as being circular, in other embodiments, a washer 222 can be substantially rounded or can have any known and/or convenient geometry and dimensions.

An engaging member 224 can be attached substantially perpendicularly to the proximal edge of an actuating collar 216, and in some embodiments, pass through an opening 221 running longitudinally through a second stop collar 220. As depicted in FIG. 2 and FIG. 2*a*, an engaging member 224 can be a rod, but in other embodiments an engaging member 224 can have any known and/or convenient geometry.

In some embodiments, as shown in FIG. 2 and FIG. 2*a*, an upper stop collar 220 can be coupled with a locking tube 208 such that an actuating collar 216 can move longitudinally between a first stop collar 214 and a upper stop collar 220. Other embodiments may only have a first stop collar 214 present without an upper stop collar 220.

A spacing tube 226 can have interior cross-sectional configuration and dimensions such that it can be selectively coupled with the proximal end of a locking tube 208. In some embodiments, a spacing tube 226 can have a length less than that of an engagement member 224. A spacing tube 226 can have a longitudinal channel 228 on its exterior surface, running along the entire length of a spacing tube 226. A longitudinal channel 228 can be of geometry and dimensions such that an engagement member 224 can rest inside of said longitudinal groove 228. In other embodiments, external guides attached to or integrated with the exterior surface of a spacing tube 226 can lie longitudinally adjacent to an engagement member 224. In some embodiments, an engagement member 224 can be attached to an actuating collar 216, pass through an opening 221 longitudinally through the wall of a second stop collar 220, and rest inside of a longitudinal channel 228 on the surface of a spacing tube 226. A first elastomeric member 230 can be housed within a spacing tube 226 proximal to a washer 222 at the proximal end of a rod 202. Although depicted in FIG. 2 as a helical coil, a first elastomeric member 230 can be any known and/or convenient device that provides a resistive force.

Figure 2C:
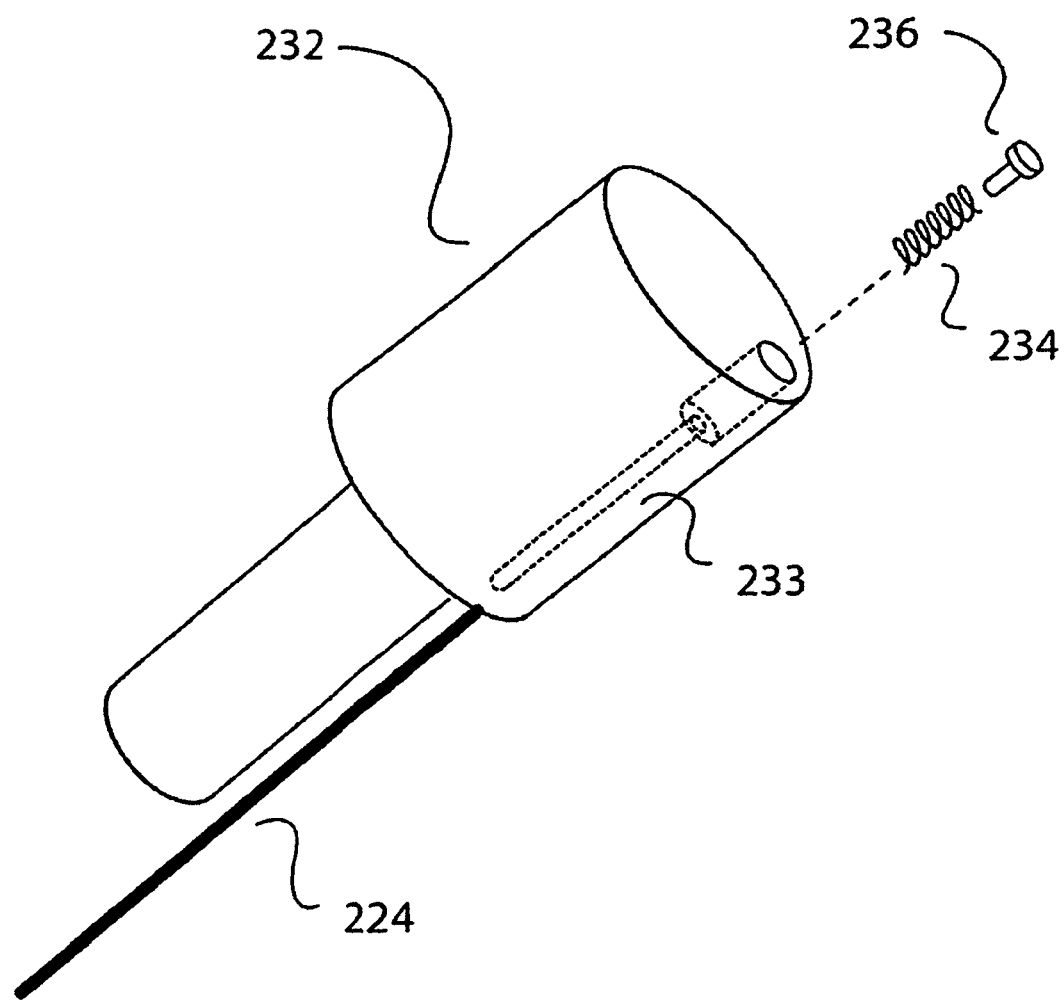
FIG. 2c is a detail of an embodiment of an embodiment of an actuation device housing component of the present device.

In some embodiments, as shown in FIG. 2*c*, the present device can have a housing 232 for an actuation device assembly. However, other embodiments do not need to have an actuation device assembly or a housing 232. A housing 232 can have a distal extension having an exterior geometry and dimensions such that it can selectively couple with the proximal end of a spacing tube 226. A housing 232 can also have a longitudinal opening 233 of geometry and dimensions such that an engagement member 224 can pass through the opening 233. At the proximal end of a longitudinal opening on the proximal surface of a housing 232, there can be an enlarged opening of geometry and dimensions such as to accommodate a second elastomeric member 234 and an actuation device 236. Although depicted in FIG. 2*c* as a helical coil, a second elastomeric member 234 can be any known and/or convenient device that provides a resistive force.

An actuation device 236 can be coupled with the proximal end of an engagement member 224 such that a second elastomeric member 234 can be positioned immediately distal to an actuation device 236. A second elastomeric member 234 can provide a resistive force against a user moving an actuation device 236. As shown in FIG. 2*c*, an actuation device 236 can have a substantially circular cross-section, but in other embodiments an actuation device 236 can have any known and/or convenient cross-sectional geometry and dimensions.

Although shown in FIG. 2 and FIG. 2*c* as having only one adjustment mechanism, in other embodiments the present device can employ a plurality of adjustment mechanisms. In some embodiments, adjustment mechanisms can be controlled via the same actuation device assembly, but in other embodiments, multiple adjustment mechanisms can be controlled by separate actuation device assemblies.

In operation of some embodiments, a user can move an engagement member 224 in a distal direction, which moves an actuating collar 216 in a distal direction relative to a locking tube 208. At least one substantially spherical member 212 then moves radially outward from the indentation 204 on a rod 202, through the at least one opening 210 in a locking tube 208, and into the indentation 218 on the interior of an actuating collar 216, releasing a rod 202. As long as the engagement member 224 is in a distal position, an actuating collar 216 is kept in a distal position and a rod 202 can move freely through a locking tube 208. A first elastomeric member 230 can provide a compression force to push a rod 202, which can be selectively engaged with a second elongated tubular member 104, in a distal direction. In some embodiments, a user can move an engagement member in a distal direction via an actuation device assembly, but other embodiments can operate without a actuation device assembly, while others can employ any known and/or convenient actuation device assembly.

To extend the overall length of the device, a user can allow a second elongated tubular member 104 to telescope outward from a first elongated tubular member 102 in response to a compression force provided by a first elastomeric member 230. To decrease the overall length of the device, a user can provide an external force greater than a compression force provided by a first elastomeric member 230 to push a second elongated tubular member 104 into a first elongated tubular member 102. For example, a user can place the distal end of the device on the ground and exert a downward force on the device to cause a second elongated tubular member 104 to retract into a first elongated tubular member 102.

When the device is at the desired overall length, a user can move an engagement member 224 in a proximal direction, which moves an actuating collar 216 also in a proximal direction relative to a locking tube 208. At least one substantially spherical member 212 moves radially inward from an indentation 218 on the interior of an actuating collar 216, through the at least one opening 210 in a locking tube 208, and into the indentations 204 on a rod 202, where the at least one substantially spherical member 212 are held in place by an actuating collar 216, which locks a rod 202 into a desired position. In some embodiments, a user can move an engagement member in a proximal direction via an actuation device assembly, but other embodiments can operate without a actuation device assembly, while others can employ any known and/or convenient actuation device assembly.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. An adjustable pole comprising:
a first elongated tubular member slidably coupled with a second elongated tubular member;
a rod having a plurality of indentations and a proximal end and a distal end, and an end member attached to the distal end of said rod;
a locking tube having at least one opening in the wall of said tube and having a proximal end and a distal end;
wherein said rod is slidably coupled inside said locking tube;
at least one substantially spherical member positioned in said at least one opening in the wall of said locking tube;
a stop collar coupled with the distal end of said locking tube;
an actuating collar, having a proximal edge and a distal edge and an indentation on the interior surface of the actuaiting collar, that is slidably coupled with said locking tube distal to said stop collar;
a spacing tube having a proximal end and a distal end and a longitudinal channel running along the entire exterior length;
an engagement member, having a proximal end and a distal end, the distal end connected to the proximal edge of said actuating collar and resting in the longitudinal groove on said spacing tube; and
a first elastomeric member located distal to said rod and inside said spacing tube.

2. The pole of claim 1, further comprising a second end member attached to the distal end of a second elongated tubular member.

3. The pole of claim 1, further comprising:
a second stop collar having an opening extending longitudinally through the wall of said collar;
wherein said second stop collar is coupled with said locking tube at a point distal to the midpoint of said locking tube, and said engagement member passes through said longitudinal opening in said second stop collar.

4. The pole of claim 1, further comprising:
At least one actuation device and a second elastomeric member connected to the proximal end of said engagement member;
a housing connected to the proximal end of said spacing tube; and
wherein said engagement member passes longitudinally through an opening in said housing and said at least one actuation device is accessible via the exterior surface of the housing.

5. The pole of claim 4, further comprising:
a second stop collar having an opening extending longitudinally through the wall of said collar;
wherein said second stop collar is coupled with said locking tube at a point distal to the midpoint of said locking tube, and said engagement member passes through said longitudinal opening in said second stop collar.

6. A mechanism to adjust a telescoping pole comprising:
a rod having a plurality of indentations and a proximal end and a distal end, and an end member attached to the distal end of said rod; and
a locking tube having at least one opening in the wall of said tube and having a proximal end and a distal end;
wherein said rod is slidably coupled inside said locking tube;
at least one substantially spherical member positioned in said at least one opening in the wall of said locking tube;
a stop collar coupled with the distal end of said locking tube;
an actuating collar, having a proximal edge and a distal edge and an indentation on the interior surface of the actuating collar, that is slidably coupled with said locking tube distal to said stop collar;
a spacing tube having a proximal end and a distal end and a longitudinal channel running along the entire exterior length;
an engagement member connected to the proximal edge of said actuating collar and resting in the longitudinal groove on said spacing tube; and
a first elastomeric member located distal to said rod and inside said spacing tube.

7. The mechanism of claim 6, further comprising:
a second stop collar having an opening extending longitudinally through the wall of said collar; wherein said second stop collar is coupled with said locking tube at a point distal to the midpoint of said locking tube, and said engagement member passes through said longitudinal opening in said second stop collar.

8. An adjustable pole comprising:
a first elongated tubular member having a proximal end and a distal end;
a second elongated tubular member having a proximal end and a distal end;
an end member having a proximal end and a distal end;
wherein the proximal end of said second elongated tubular member is slidably coupled with the distal end of said first elongated member and said end member is attached to the distal end of said second elongated member;
a rod having a plurality of circumferential grooves and a proximal end and a distal end;
a second end member;
wherein said second end member is attached to the distal end of said rod;
a locking tube having at least one opening in the wall of said locking tube and having a proximal end and a distal end;
a first stop collar;
a second stop collar having an opening extending longitudinally through the wall of said collar;
an actuating collar, having a proximal edge and a distal edge and a circumferential groove on the interior surface of the actuating collar;
at least one substantially spherical member;
wherein said first stop collar is coupled with the distal end of said locking tube, said second stop collar is coupled with said locking tube at a point distal to the midpoint of said locking tube, and said actuating collar is slidably coupled with said locking tube between said first stop collar and said second stop collar,
said rod is slidably coupled with said locking tube, and said at least one substantially spherical member is positioned in the at least one opening in the surface of said locking tube, such that said at least one substantially spherical member can move into and out of the grooves on said rod and the groove on the interior surface of said actuating collar;

an engagement member, having a proximal end and a distal end, wherein the distal end of said engagement member is connected to the proximal edge of said actuating collar and passes through said longitudinal hole in said second stop collar;

a spacing tube having a proximal end and a distal end and a longitudinal groove running along the entire exterior length;

wherein the proximal end of said locking tube couples with the distal end of said spacing tube such that said engagement member rests in the longitudinal groove on said spacing tube;

a first elastomeric member;

wherein said first elastomeric member is located distal to said rod and inside said spacing tube;

a housing, having a distal extension that is coupled with the proximal end of said spacing tube and a longitudinal opening extending through the length of said housing and an enlarged opening at the proximal end of said opening;

an actuation device; and a second elastomeric member;

wherein said actuation device is connected to the proximal end of said engagement member and said second elastomeric member is positioned between said actuation device and said housing.

* * * * *